US008316447B2

(12) United States Patent
Guruswamy (10) Patent No.: US 8,316,447 B2
(45) Date of Patent: Nov. 20, 2012

(54) RECONFIGURABLE MESSAGE-DELIVERY PRECONDITIONS FOR DELIVERING ATTACKS TO ANALYZE THE SECURITY OF NETWORKED SYSTEMS

(75) Inventor: Kowsik Guruswamy, Sunnyvale, CA (US)

(73) Assignee: Mu Dynamics, Inc., Sunnyvale, CA (US)

( * ) Notice: Subject to any disclaimer, the term of this patent is extended or adjusted under 35 U.S.C. 154(b) by 1143 days.

(21) Appl. No.: 11/557,945

(22) Filed: Nov. 8, 2006

(65) Prior Publication Data

US 2008/0072322 A1 Mar. 20, 2008

Related U.S. Application Data

(63) Continuation-in-part of application No. 11/514,809, filed on Sep. 1, 2006.

(51) Int. Cl.
*H04L 29/06* (2006.01)
(52) U.S. Cl. ............... 726/25; 726/22; 726/23; 726/24
(58) Field of Classification Search ........... 713/187, 713/188; 726/3, 4, 5, 11, 22, 23, 24, 25; 714/41, 38, 39, 43; 709/223, 224; 370/252
See application file for complete search history.

(56) References Cited

U.S. PATENT DOCUMENTS

| 5,067,104 | A | 11/1991 | Krishnakumar et al. |
| 5,459,837 | A | 10/1995 | Caccavale |
| 5,485,409 | A | 1/1996 | Gupta et al. |
| 5,892,903 | A | 4/1999 | Klaus |
| 6,088,804 | A | 7/2000 | Hill et al. |
| 6,324,656 | B1 * | 11/2001 | Gleichauf et al. ............. 714/37 |
| 6,363,477 | B1 | 3/2002 | Fletcher et al. |
| 6,574,737 | B1 * | 6/2003 | Kingsford et al. ............. 726/25 |
| 6,584,569 | B2 | 6/2003 | Reshef et al. |
| 6,609,205 | B1 | 8/2003 | Bernhard et al. |
| 6,654,914 | B1 | 11/2003 | Kaffine et al. |
| 6,952,779 | B1 | 10/2005 | Cohen et al. |
| 7,152,105 | B2 * | 12/2006 | McClure et al. ............. 709/224 |

(Continued)

FOREIGN PATENT DOCUMENTS

WO 2006/099536 9/2006

OTHER PUBLICATIONS

Bellovin, S., "A Technique for Counting NATted Hosts," Proceedings: Second Internet Measurement Workshop (IMW), Marseille, France, Nov. 6-8, 2002, pp. 267-272.

(Continued)

*Primary Examiner* — Eleni Shiferaw
*Assistant Examiner* — Hilary Branske
(74) *Attorney, Agent, or Firm* — Haynes Beffel & Wolfeld LLP; Ernest J. Beffel, Jr.

(57) ABSTRACT

A security analyzer analyzes a security of a device-under-analysis (DUA). In one embodiment, the security analyzer identifies two or more valid message-delivery preconditions for a communication protocol supported by the DUA. One of the identified valid message-delivery preconditions is selected and the security analyzer delivers an attack to the DUA according to the selected message-delivery precondition. The same or similar attacks can also be delivered to the DUA via other message-delivery preconditions. Based on the DUA's response, the security analyzer determines whether a vulnerability has been found.

19 Claims, 4 Drawing Sheets

U.S. PATENT DOCUMENTS

| | | | |
|---|---|---|---|
| 7,159,151 B2 | 1/2007 | Morgan et al. | |
| 7,178,166 B1 | 2/2007 | Taylor et al. | |
| 7,181,769 B1* | 2/2007 | Keanini et al. | 726/23 |
| 7,185,232 B1* | 2/2007 | Leavy et al. | 714/41 |
| 7,243,148 B2 | 7/2007 | Keir et al. | |
| 7,257,630 B2 | 8/2007 | Cole et al. | |
| 7,272,650 B2 | 9/2007 | Elgebaly et al. | |
| 7,290,145 B2 | 10/2007 | Falkenthros | |
| 7,315,801 B1 | 1/2008 | Dowd et al. | |
| 7,342,892 B2 | 3/2008 | Soon et al. | |
| 7,346,922 B2 | 3/2008 | Miliefsky | |
| 7,421,621 B1 | 9/2008 | Zambrana | |
| 7,447,966 B2 | 11/2008 | Kamannavar et al. | |
| 7,451,488 B2 | 11/2008 | Cooper et al. | |
| 7,471,999 B2 | 12/2008 | Taki | |
| 7,509,675 B2 | 3/2009 | Aaron | |
| 7,512,125 B2 | 3/2009 | Betts et al. | |
| 7,536,456 B2 | 5/2009 | Williams et al. | |
| 7,536,605 B2* | 5/2009 | Keaffaber et al. | 714/41 |
| 7,543,056 B2 | 6/2009 | McClure et al. | |
| 7,594,142 B1* | 9/2009 | O'Leary et al. | 714/38.11 |
| 7,607,170 B2 | 10/2009 | Chesla | |
| 7,624,422 B2 | 11/2009 | Williams et al. | |
| 7,627,891 B2 | 12/2009 | Williams et al. | |
| 7,627,900 B1 | 12/2009 | Noel et al. | |
| 7,664,845 B2 | 2/2010 | Kurtz et al. | |
| 7,673,043 B2 | 3/2010 | Keir et al. | |
| 7,774,637 B1 | 8/2010 | Beddoe et al. | |
| 7,827,531 B2* | 11/2010 | Sen et al. | 717/124 |
| 7,954,161 B1 | 5/2011 | Guruswamy et al. | |
| 7,958,230 B2 | 6/2011 | Guruswamy et al. | |
| 7,958,560 B1 | 6/2011 | Guruswamy | |
| 2001/0034847 A1 | 10/2001 | Gaul, Jr. | |
| 2002/0157041 A1 | 10/2002 | Bennett et al. | |
| 2002/0194469 A1* | 12/2002 | Dominique et al. | 713/150 |
| 2003/0004684 A1* | 1/2003 | Skingsley et al. | 702/186 |
| 2003/0009696 A1* | 1/2003 | Bunker et al. | 713/201 |
| 2003/0051163 A1 | 3/2003 | Bidaud | |
| 2003/0154399 A1 | 8/2003 | Zuk et al. | |
| 2003/0159063 A1 | 8/2003 | Apfelbaum et al. | |
| 2004/0001443 A1 | 1/2004 | Soon et al. | |
| 2004/0068586 A1 | 4/2004 | Xie et al. | |
| 2004/0068675 A1 | 4/2004 | Liu | |
| 2004/0068681 A1* | 4/2004 | Smith | 714/43 |
| 2004/0103315 A1* | 5/2004 | Cooper et al. | 713/201 |
| 2004/0205557 A1 | 10/2004 | Bahrs et al. | |
| 2004/0230881 A1 | 11/2004 | Gwak | |
| 2005/0010819 A1* | 1/2005 | Williams et al. | 713/201 |
| 2005/0015213 A1 | 1/2005 | Somervill et al. | |
| 2005/0021715 A1* | 1/2005 | Dugatkin et al. | 709/223 |
| 2005/0044418 A1 | 2/2005 | Miliefsky | |
| 2005/0135391 A1 | 6/2005 | Sung | |
| 2005/0144137 A1 | 6/2005 | Kumar et al. | |
| 2005/0195820 A1 | 9/2005 | Betts et al. | |
| 2005/0248457 A1 | 11/2005 | Himberger et al. | |
| 2005/0273772 A1 | 12/2005 | Matsakis et al. | |
| 2005/0273854 A1 | 12/2005 | Chess et al. | |
| 2005/0273859 A1* | 12/2005 | Chess et al. | 726/25 |
| 2006/0005231 A1 | 1/2006 | Zuk et al. | |
| 2006/0015941 A1 | 1/2006 | McKenna | |
| 2006/0015943 A1 | 1/2006 | Mahieu | |
| 2006/0021034 A1 | 1/2006 | Cook | |
| 2006/0021044 A1 | 1/2006 | Cook | |
| 2006/0021045 A1 | 1/2006 | Cook | |
| 2006/0021046 A1 | 1/2006 | Cook | |
| 2006/0021047 A1 | 1/2006 | Cook | |
| 2006/0021048 A1 | 1/2006 | Cook et al. | |
| 2006/0021049 A1 | 1/2006 | Cook | |
| 2006/0036755 A1 | 2/2006 | Abdullah et al. | |
| 2006/0080733 A1 | 4/2006 | Khosmood et al. | |
| 2006/0085723 A1 | 4/2006 | Bartz et al. | |
| 2006/0098579 A1 | 5/2006 | Chang et al. | |
| 2006/0106939 A1 | 5/2006 | Cha et al. | |
| 2006/0137009 A1 | 6/2006 | Chesla | |
| 2006/0277606 A1 | 12/2006 | Yunus et al. | |
| 2007/0006037 A1 | 1/2007 | Sargusingh et al. | |
| 2007/0011319 A1 | 1/2007 | McClure et al. | |
| 2007/0086389 A1 | 4/2007 | Park et al. | |
| 2007/0094728 A1 | 4/2007 | Julisch et al. | |
| 2007/0115962 A1 | 5/2007 | Mammoliti et al. | |
| 2007/0174917 A1 | 7/2007 | Guruswamy | |
| 2007/0204347 A1 | 8/2007 | Caceres et al. | |
| 2008/0005555 A1 | 1/2008 | Lotem et al. | |
| 2008/0092237 A1 | 4/2008 | Yoon et al. | |
| 2008/0098479 A1 | 4/2008 | O'Rourke et al. | |
| 2008/0120283 A1 | 5/2008 | Liu et al. | |
| 2008/0155338 A1 | 6/2008 | Rusmanov | |
| 2008/0282352 A1 | 11/2008 | Beddoe et al. | |
| 2009/0083854 A1 | 3/2009 | Bozanich et al. | |
| 2009/0271863 A1 | 10/2009 | Govindavajhala et al. | |
| 2009/0320137 A1 | 12/2009 | White et al. | |
| 2009/0328190 A1 | 12/2009 | Liu et al. | |
| 2010/0106742 A1 | 4/2010 | Guruswamy | |
| 2010/0284282 A1 | 11/2010 | Golic | |
| 2010/0293415 A1 | 11/2010 | Beddoe et al. | |

OTHER PUBLICATIONS

Bradner, S. et al., "Benchmarking Methodology for Network Interconnect Devices (RFC 1944)," May 1996, [online] [Retrieved on May 12, 2006] Retrieved from the Internet <URL: http://rfc.net/rfc1944.html>.

Bradner, S. et al., "Benchmarking Methodology for Network Interconnect Devices (RFC 2544)," Mar. 1999, [online] [Retrieved on May 12, 2006] Retrieved from the Internet <URL: http://rfc.net/rfc2544.html>.

Cisco Systems, Inc., "Mobile IP—NAT Detect" in "Cisco IOS IP Mobility Configuration Guide, Release 12.4," 2005, [online] [Retrieved on May 12, 2006] Retrieved from the Internet <URL:http://www.cisco.com/univercd/cc/td/doc/product/software/ios124/124cg/himo_c/ch05/hnatrav.pdf>.

Dunn, J. et al., "Methodology for ATM Benchmarking (RFC 3116)," Jun. 2001, [online] [Retrieved on May 12, 2006], Retrieved from the Internet <URL: http://rfc.net/rfc3116.html>.

Egevang, K., et al., "The IP Network Address Translator (NAT) (RFC 1631)," May 1994, [online] [Retrieved on May 12, 2006] Retrieved from the Internet <URL: http://rfc.net/rfc1631.html>.

Microsoft Corp., "Overview of Network Address Translation (NAT) in Windows XP," Sep. 12, 2005, [online] [Retrieved on May 12, 2006] Retrieved from the Internet <URL: http://www.microsoft.com/technet/prodtechnol/winxppro/deploy/nattrnsv.mspx?pf=true>.

Netcom Systems, "SmartWindow User Guide Version 6.53," Document No. 340-1020-001 REV C, Dec. 1999, [online] [Retrieved on May 12, 2006] Retrieved from the Internet <URL: http://cobra.ee.ntu.edu.tw/~oops/HTML6/08_exp/smartbit%20reading.pdf>.

Nikolic, M., "Performance Measurements of Multimedia Transmissions in IP over ATM Networks," Master's Thesis, School of Engineering Science, Simon Fraser University, Dec. 2002, [online] [Retrieved on May 12, 2006] Retrieved from the Internet <URL: http://142.58.111.30/~Ijilja/cnl/pdf/milan.pdf>.

PCT International Search Report and Written Opinion, PCT/US06/09512, Aug. 31, 2006, 7 pages.

Sorensen, S., "Intrusion Detection and Prevention: Protecting Your Network from Attacks," Document No. 200065-002, 2006, [online] [Retrieved on May 12, 2006] Retrieved from the Internet <URL: http://www.juniper.net/solutions/literature/white_papers/200065.pdf>.

Srisuresh, P. et al., "IP Network Address Translator (NAT) Terminology and Considerations (RFC 2663)," Aug. 1999, [online] [Retrieved on May 12, 2006] Retrieved from the Internet <URL: http://rfc.net/rfc2663.html>.

Srisuresh, P. et al., "Traditional IP Network Address Translator (Traditional NAT) (RFC 3022)," Jan. 2001, [online] [Retrieved on May 12, 2006] Retrieved from the Internet <URL: http://rfc.net/rfc3022.html>.

Trend Communications, "RFC 2544 Testing with Aurora Tango," date unknown, [online] [Retrieved on May 12, 2006] Retrieved from the Internet <URL: http://www.trendtest.co.uk/trendweb/resource.nsf/vlFileURLLookup/en%5E%5ERFC+2544+testing/$File/GbEnet.2544.test.pdf>.

Udupa, R. et al., "Performance Issues and Evaluation Techniques for Networking Devices," 2001, [online] [Retrieved on May 12, 2006]

Retrieved from the Internet <URL: http://softwaredioxide.com/Channels/events/testing2001/Presentations/raghavendra_infosys.pdf>.

Wikipedia.com, Tunneling Protocol, http://en.wikipedia.org/wiki/Tunneling_protocol, [online], [Retrieved on Nov. 16, 2007, Last Modified on Nov. 16, 2007], Retrieved from the Internet <URL: http://en.wikipedia.org/wiki/Tunneling_protocol>.

Wikipedia.com, Session Initiation Protocol, http://en.wikipedia.org/wiki/Session_initiation_protocol, [online], [Retrieved on Nov. 16, 2007, Last Modified on Nov. 16, 2007], Retrieved from the Internet <URL: http://en.wikipedia.org/wiki/Session_initiation_protocol>.

Gordano.com, "What is the SMTP/EHLO clause?" Company Website, http://www.gordano.com/kb.htm?q=316, [online], [Retrieved on Nov. 16, 2007, Last Modified on Nov. 16, 2007], Retrieved from the Internet <URL: http://www.gordano.com/kb.htm?q=316>.

Wagner, D. et al., "Intrusion Detection Via Static Analysis", IEEE Symposium on Security and Privacy, 2001, pp. 156-168.

Finlay, I. et al., "Multiple Vulnerabilities in Many Implementations of the Simple Network Management Protocol (SNMP)", CERT® Advisory CA-2002-03, Pittsburgh, PA, US.

Griffin, J.L., "Testing Protocol Implementation Robustness", Published in the Proceedings of 29th Annual International Symposium on Fault-Tolerant Computing (FTC), Jun. 15-18, 1999, Madison, Wisconsin, US.

Kaksonen, R., "A Functional Method for Assessing Protocol Implementation Security", VTT Publications 448, 2011, 128 p.+app. 15p., Technical Research Centre of Finland, FI.

Kaksonen, R., "Software Security Assessment through Specification Mutations and Fault Injection", Proceedings of the Int'l Federation for Information Processing (IFIP), TC-6/TC-11 Fifth Joint Int'l Working Conference on Communications and Multimedia Security (CMS'01), May 21-22, 2001, Darmstadt, Germany, pp. 173-183.

Miller, B. et al., "Fuzz Revisited: A Re-examination of the Reliabiltiy of Unix Utilities and Services", Computer Sciences Department, Oct. 1995, pp. 1-23, Madison, Wisconsin, US.

PROTOS Test-Suite: c06-snmpv1, University of Oulu (ee.oulu.fi)—http://www.ee.oulu.fi/research/ouspg/protos/testing/c06/snmpv1/index, Oct. 17, 2002, pp. 1-26, Finland.

Protos Test-Suite: c06-ldapv3, University of Oulu (ee.oulu.fi)—http://www.ee.oulu.fi/research/ouspg/protos/testing/c06/ldapv3/index.html, Dec. 2001, p. 1-13, Finland.

Beddoe, M., "Network Protocol Analysis using Bioinformatics Algorithms", 2004, retrieved on May 17, 2007, from <URL: http://www.4phi.net/~awalters/PI/pi.pdf>.

Case, J. et al., "A Simple Network Management Protocol (SNMP)" (RFC 1157), May 1990, retrieved on May 17, 2007, from <URL: http://www.faqs.org/rfcs/rfc1157.html>.

Marquis, S., et al., "SCL: A Language for Security Testing of Network Applications", Proceedings: 15th IBM Centre for Advanced Studies Conference (CASCON), Toronto, Canada, Oct. 2005, pp. 155-164, retrieved on May 17, 2007, from <URL: http://post.queensu.ca/~trd/research/papers/marquisSCL.pdf>.

McCloghrie K. et al., "Structure of Management Information Version 2 (SMIv2)" (RFC 2578), Apr. 1999, retrieved on May 17, 2007, from URL:http://www.faqs.org/rfcs/rfc2578.html>.

Nevill-Manning, C. et al., "Identifying Hierarchical Structure in Sequences: A linear-time algorithm", Journal of Artificial Intelligence Research, vol. 7, Sep. 1997, pp. 67-82, retrieved on May 17, 2007, from <URL: http://arxiv.org/abs/cs/9709102>.

Tal, O. et al., "Syntax-based Vulnerability Testing of Frame-based Network Protocols", Proceedings: 2nd Annual Conference on Privacy, Security and Trust, Fredericton, Canada, Oct. 2004, pp. 155-160, retrieved on May 17, 2007, from <URL: http://post.queensu.ca/~trd/research/papers/FinalPST04.pdf>.

Turcotte, Y. et al., "Security Vulnerabilities Assessment of the X.509 Protocol by Syntax-based Testing", Military Communications Conference (MILCOM), Monterey, CA, Oct. 2004, vol. 3, pp. 1572-1578, retrieved from <URL: http://postqueensu.ca/~trd/research/papers/MILCOM.pdf>.

Zhang, S. et al., "A Lightweight Approach to State Based Security Testing", Proceedings: 16th IBM Centre for Advanced Studies Conference (CASCON), Toronto, Canada, Oct. 2006, Article No. 28, retrieved on May 17, 2007, from <URL: http://post.queensu.ca/~trd/research/papers/zhangState.pdf>.

Zhang, S. et al., "Applying Software Transformation Techniques to Security Testing", Proceedings: Software Technology and Engineering in Practice (STEP), Toronto, Canada, Oct. 2005, retrieved on May 17, 2007, from <URL: http://post.queensu.ca/~trd/research/papers/step2005.pdf>.

Aitel, D., "An Introduction to SPIKE, the Fuzzer Creation Kit" (presentation slides), Aug. 1, 2002, Black Hat USA, Las Vegas, NV, online, retrieved Jun. 26, 2007, from <URL: https://www.blackhat.com/presentations/bh-usa-02/bh-us-02-aitel-spike.ppt>.

Beddoe, M., "Heuristics for Packet Field Identification", Mu Security Research Labs blog, Jan. 4, 2007, online, retrieved Jun. 26, 2007, from <URL: http://labs.musecurity.com/2007/01/04/heuristics-for-packet-field-identification/>.

Beddoe, M., "The Protocol Informatics Project: Automating Network Protocol Analysis" (presentation slides), 2005.

Sonne, B., "Covert Channel detection using Bioinformatics Algorithms", nCircle 360 Security blog, May 11, 2006, online, retrieved on Jun. 26, 2007, from <URL: http://blog.ncircle.com/archives/2006/05/covert_channel_detection_using.html>.

Beizer, B., "Chapter 9: Syntax Testing", in Software Testing Techniques, 2nd Ed., 1990, pp. 284-319, Van Nostrand Reinhold, New York, NY.

Beizer, B., "Chapter 8: Syntax Testing", in Black-Box Testing: Techniques for Functional Testing of Software and Systems, 1995, pp. 177-201, John Wiley & Sons, Inc., New York, NY.

Kaksonen, R. et al., "Vulnerability Analysis of Software through Syntax Testing", 2000, online, retrieved on Sep. 1, 2006, from <URL: http://www.ee.oulu.fi/research/ouspg/protos/analysis/WP2000-robustness/>.

Mu Security, "6 Degrees of Protocols", 2006.

Mu Security, "Protocol Vulnerability Patterns", Apr. 2006.

Rubin, S. et al., "On the Completeness of Attack Mutation Algorithms", 19th IEEE Computer Security Foundations Workshop (CSFW), Jul. 2006, 14 pages, Online, retrieved on Jan. 19, 2010, from <URL: http://pages.cs.wisc.edu/~jha/jha-papers/security/CSFW_2006.pdf>.

Turcotte, Y., "Syntax Testing of Communication Protocols for Security Vulnerabilities (Testing of a subset of the Entrust PKI)", Nov. 2003, online, retrieved on Sep. 1, 2006, from <URL: http://tarpit.rmc.ca/paul/EEE491A%20Fall%202003/Slides/EE491%20GL3%20Syntax%20Testing.ppt>.

Xiao, S. et al., "Integrated TCP/IP Protocol Software Testing for Vulnerability Detection", Proceedings of International Conference on Computer Networks and Mobile Computing (ICCNMC'03), Oct. 20-23, 2003, Shanghai, China, pp. 311-319.

U.S. Appl. No. 11/514,809, filed Sep. 1, 2006.
U.S. Appl. No. 11/859,691, filed Sep. 21, 2007.
U.S. Appl. No. 11/351,402, filed Feb. 10, 2006.
U.S. Appl. No. 11/696,605, filed Apr. 4, 2007.
U.S. Appl. No. 13/154,636, filed Jun. 7, 2011.
U.S. Appl. No. 12/982,381, filed Dec. 30, 2010.
U.S. Appl. No. 12/234,450, filed Jun. 8, 2007.

* cited by examiner

RECONFIGURABLE MESSAGE-DELIVERY PRECONDITIONS FOR DELIVERING ATTACKS TO ANALYZE THE SECURITY OF NETWORKED SYSTEMS

CROSS-REFERENCE TO RELATED APPLICATIONS

The present invention is a continuation-in-part of U.S. Utility patent application Ser. No. 11/514,809, entitled "Automated Generation of Attacks for Analyzing the Security of Communication Protocols and Channels," by Kowsik Guruswamy, Marshall A. Beddoe, Michael C. Birk, Aaron D. Turner, and Jens H. Schmidt, filed on Sep. 1, 2006, the disclosure of which is hereby incorporated by reference in its entirety.

BACKGROUND

The present invention relates to automated delivery of attacks for security analysis of hardware and/or software.

Computerized communication, whether it occurs at the application level or at the network level, generally involves the exchange of data or messages in a known, structured format (a "protocol"). Software applications and hardware devices that rely on these formats can be vulnerable to various attacks that are generally known as "protocol abuse." Protocol abuse consists of sending messages that are invalid or malformed with respect to a particular protocol ("protocol anomalies") or sending messages that are well-formed but inappropriate based on a system's state. Messages whose purpose is to attack a system are commonly known as malicious network traffic.

One way to identify the vulnerability of a system to the malicious network traffic is to analyze a system ahead of time to discover or identify any vulnerabilities. This way, the vulnerabilities can be addressed before the system is deployed or released to customers. This process, which is known as "security analysis," can be performed using various methodologies. One methodology for analyzing the security of a device-under-analysis (DUA) is to treat the DUA as a black box. Under this methodology, the DUA is analyzed via the interfaces that it presents to the outside world. As a result, it is not necessary to access the source code or object code comprising the DUA.

For example, a security analyzer sends one or more messages (test messages) to the DUA, and the DUA's response is observed. A response can include, for example, registering an error or generating a message (response message). The DUA can then send the response message to the security analyzer. Depending on the analysis being performed, the security analyzer might send another test message to the DUA upon receiving the response message from the DUA. The test messages and response messages can be analyzed to determine whether the DUA operated correctly.

However, in order for the test message (also referred to as an attack) to reach and be processed by the DUA, it normally must be routed to the DUA in a manner that complies with protocols supported by the DUA (and the network path to the DUA). Also, because the specification for a protocol may allow significant choice in its actual implementation, the attack may fail to reach the DUA if it does not comply with the specific protocol implementation and configuration used by the DUA (collectively known as the "protocol deployment").

In addition, a DUA often supports multiple protocols. Each of the protocols can be designed using several protocol layers (see, e.g., the Open Systems Interconnection (OSI) Reference Model, which has seven layers). The protocols can share one or more lower-layer protocols. These structural interdependencies and relationships between protocols and their implementations dramatically increase the number of paths by which an attack can reach a DUA and also are themselves potential vulnerabilities of the DUA.

Therefore, it is important to discover the different combinations of requirements that would allow a message to successfully reach a DUA (which shall be referred to as a message-delivery precondition), to test the vulnerability of the DUA by delivering attacks via these different combinations and to identify vulnerabilities in the combinations themselves.

SUMMARY

The present invention provides a security analyzer for analyzing a security of a device-under-analysis (DUA). In one embodiment, the security analyzer identifies two or more valid message-delivery preconditions for a communication protocol supported by the DUA. One of the identified valid message-delivery preconditions is selected and the security analyzer delivers an attack to the DUA according to the selected message-delivery precondition. The same or similar attacks can also be delivered to the DUA via other message-delivery preconditions. Based on the DUA's response, the security analyzer determines whether a vulnerability has been found.

In one implementation, the message-delivery preconditions comprise different combinations of precondition components. Examples of precondition components can include network protocols (such as transport layer protocols, network layer protocols, data link layer protocols, and tunneling protocols) and protocol states (such as authentication schemes and initial protocol negotiation options). For example, message-delivery preconditions can be expressed as a graph where the nodes are different states for the various precondition components. Different paths through the graph then represent different message-delivery preconditions.

In one embodiment, the security analyzer is an appliance that is capable of transmitting messages to the DUA and discovering what protocols and message-delivery preconditions are supported in the DUA based on the responses (or non-responses) from the DUA. In one approach, the security analyzer identifies a plurality of message-delivery precondition components associated with a communication protocol supported by the DUA. Typically, the precondition components will have multiple states. The security analyzer selects different combinations of states for the precondition components and attempts to communicate with the DUA through the communication protocol according to the selected combinations of states. Based on the attempted communication, the security analyzer decides which of the selected combinations of states are valid message-delivery preconditions.

Other aspects of the invention include software, systems, components, and methods corresponding to the above, and applications of the above for purposes other than security analysis.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Security Analyzer

Figure 1:
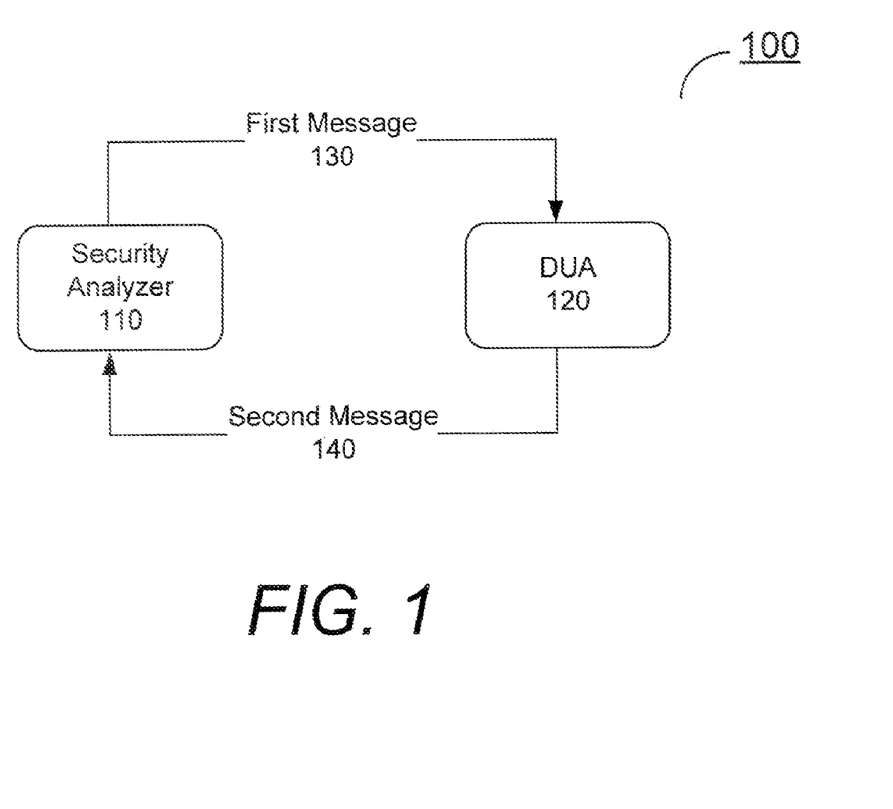
FIG. 1 illustrates a system that includes a security analyzer, a device-under-analysis, a first message, and a second message, according to one embodiment of the invention.

A security analyzer (a platform for analyzing the security of a device) 110 tests a device-under-analysis (DUA) 120 by sending one or more test messages 130 to the DUA, possibly receiving one or more response messages 140 from the DUA, possibly continuing the message exchange further, and then analyzing the received messages. Specifically, the security analyzer 110 determines whether the DUA 120 operated correctly by considering a pair of messages (or possibly more if a lengthier message exchange is involved), where the first message 130 was sent to the DUA and the second message 140 was generated by the DUA in response to the first message. FIG. 1 illustrates a system 100 that includes a security analyzer, a device-under-analysis, a first message, and a second message, according to one embodiment of the invention.

In the following description, "device," "device-under-analysis," and "DUA" represent software and/or hardware. Software includes, for example, applications, operating systems, and/or communications systems. Hardware includes, for example, one or more devices. A device can be, for example, a computer, switch, bridge, router (including wireline or wireless), packet filter, firewall (including stateful or deep inspection), Virtual Private Network (VPN) concentrator, Network Address Translation (NAT)-enabled device, proxy (including asymmetric), intrusion detection/prevention system, or network protocol analyzer. A DUA 120 can also be multiple devices that are communicatively coupled to and/or form a system or network of devices. For example, a DUA 120 can be two firewall devices that establish an encrypted tunnel in between. There can also be devices located between the security analyzer 110 and the DUA 120, although FIG. 1 omits such devices for clarity.

In one embodiment, a security analyzer 110 tests the communication protocols and/or channels of a device 120. A "protocol" refers to an exchange of data or messages in a known, structured format. Specifically, a protocol refers to what is being communicated (for example, the data or message content). A security analyzer 110 can test various types of communication protocols, regardless of whether they are public or proprietary. Types of protocols include, for example, networking protocols (including network packets), application program interfaces (APIs; including API calls, remote method invocation (RMI), and remote procedure call (RPC)), and file formats. Appendix A contains exemplary networking protocols, APIs, and file formats. In one embodiment, the security analyzer 110 can discover the protocols supported by a DUA 120 in addition to testing them.

A protocol generally has three characteristics: structure, semantics, and state. Therefore, when a security analyzer 110 tests a protocol, it tests the protocol's structure, semantics, and/or state. Protocol structure (also known as syntax) refers to the layout of a message, such as its fields, arguments, or parameters, and its possible length. Protocol semantics refers to the context of a message, such as its actual content and what the content means. Protocol state refers to how the history of previous messages affects later messages. Appendix B contains types of attacks to test a protocol's structure, semantics, and/or state.

A "channel" refers to how protocol data is communicated. Specifically, a channel refers to how a message 130 is delivered to a DUA 120 (for example, using Ethernet on top of a wireless network). One example of a channel attack is sending too many messages at once, thereby flooding a network and resulting in a denial of service (DoS).

In one embodiment, a security analyzer 110 treats a DUA 120 as a black box. Under this methodology, the DUA 120 is analyzed via the interfaces that it presents to the outside world. Analysis includes, for example, discovering the protocols of the DUA 120 and "attacking" the DUA by sending one or more messages (attack messages) to it and then observing the DUA's response. A response can include, for example, generation of an error or generation of a response message. Based on the DUA 120's response, the security analyzer 110 can determine whether a vulnerability has been found. In one embodiment, the security analyzer 110 is used to identify a particular attack (e.g., one or more attack messages) that causes a DUA 120 to fail or otherwise alter its behavior.

Message-Delivery Preconditions

In order for a message 130 to successfully reach a DUA 120, multiple requirements typically must be satisfied. These requirements can include, for example, that the message 130 comply with the tunneling protocol and the layered protocols used by the DUA and that these protocols be set to the proper protocol states at the DUA in order to accept messages 130. These requirements will be referred to as the message-delivery precondition. A message-delivery precondition must be satisfied before a message 130 can successfully reach the DUA 120. The message-delivery precondition typically has multiple components (i.e., the individual requirements), which shall be referred to as message-delivery precondition components or simply precondition components. It should be understood that, although the phrase "message-delivery" is used, not all of the message-delivery precondition components relate directly to delivery (i.e., transport) mechanisms.

In more detail, a DUA 120 typically supports one or more protocols by implementing them. For example, a DUA 120 might be a computer with several applications installed, each of which supports a protocol (e.g., Simple Mail Transfer Protocol (SMTP), File Transfer Protocol (FTP), and Transport Control Protocol (TCP)). As another example, a DUA 120 might be a software application that supports multiple protocols. For example, the software application can be a web browser that supports both Hyper Text Transfer Protocol (HTTP) and HTTP Over SSL (HTTPS).

In order for a message 130 to successfully reach the DUA 120, it typically will comply with a protocol supported by the DUA 120. However, a protocol is often designed using several protocol layers (see, e.g., the Open Systems Interconnection (OSI) Reference Model, which has seven layers). In a layered protocol, a higher-layer protocol (e.g., TCP, a transport layer protocol) runs on top of a lower-layer protocol (e.g., Internet Protocol version 4 (IPv4) and Internet Protocol version 6 (IPv6), both network layer protocols). Thus, the implementation of a higher-layer protocol depends on the implementation of a lower-layer protocol. Therefore, the message 130 also complies at all layers below (in addition to complying at the top-layer) in order to successfully reach the DUA 120. For example, the DUA 120 can support HTTP running on top of TCP. In order for the message 130 to reach the DUA 120, it complies with both HTTP and TCP.

In order to comply with a protocol, the message 130 typically includes additional information (e.g., header information) that helps the network route it to the DUA 120. This additional information can differ based on which protocol is being used to send the message 130. For example, if the message 130 is being sent over a TCP/IP connection, it includes both TCP information and IP information to be routed correctly to the intended destination. The message 130 cannot be sent to the DUA 120 (under normal conditions) unless it includes the necessary protocol information.

In addition, the protocols used to send the message 130 should be set to proper protocol states before the message 130 can successfully reach the DUA 120. As described above, protocol state refers to how the history of previous messages affects later messages. For example, some DUAs 120 do not accept messages from a client before the client successfully establishes a transmission channel. As another example, a DUA 120 can require proper authentication before accepting messages from a client. Therefore, in order for the message 130 to successfully reach the DUA 120, the protocols used should be set to proper protocol states.

A message 130 can also use different protocols to reach the same DUA 120. For example, a DUA 120 might support multiple different protocols. In a layered protocol, a higher-layer protocol can be configured to work with different lower-layer protocols. For example, a DUA 120 supporting TCP (the higher-layer protocol) can be configured to work with both IPv4 and IPv6 (the lower-layer protocol). Therefore, the message 130 can successfully reach the DUA 120 by either complying with TCP/IPv4 or TCP/IPv6, assuming it meets other requirements (e.g., the protocols used are in proper protocol states).

The deployment of a protocol refers to which protocol features are actually supported in implementation and configuration of a device. Even though a DUA 120 may support a protocol, it may implement only a subset of the features described in the specification of the protocol. Also, among the implemented features, only a subset may be configured to be enabled. For example, even though SMTP can run on top of IPv6, some DUAs 120 may not implement IPv6, while some other DUAs 120 may have the implementation in place, but are configured to turn the support of IPv6 off. As a result, DUAs 120 supporting SMTP may not necessarily support IPv6, depending on their deployments. Thus, messages 130 successfully reached one DUA 120 may fail to reach another, even though both DUAs 120 support the protocols used to send the messages 130. A protocol feature is deployed only if it is both implemented and configured (enabled) on a device.

Similarly, depending on actual deployments, the protocols supported by a DUA 120 can require different chronological messages to set proper protocol states. For example, some DUAs 120 supporting SMTP require clients to submit a HELO command to establish a transmission channel, while other DUAs 120 require an EHLO command instead. Also, the protocols can be configured to enable a range of authentication schemes, from no authentication requirements to challenge-response authentication mechanisms such as CRAM-MD5. Therefore, even if a message 130 complies with the protocols of a DUA 120, if the protocols are not in proper protocol states, the message 130 cannot reach the DUA 120.

Tunneling is a technique that transmits one communication protocol that is encapsulated inside another protocol. The encapsulation of the first protocol can follow one of multiple tunneling protocols such as Layer 2 Tunneling Protocol (L2TP), Point-to-Point Protocol over Ethernet (PPPoE), Generic Routing Encapsulation (GRE), IEEE 802.1Q (802.1q), Multi-Protocol Label Switching (MPLS), etc. If the DUA 120, or a network device (e.g., firewall) located between the security analyzer 110 and the DUA 120, requires tunneling, the message 130 typically will comply with the corresponding tunneling protocol in order to successfully reach the DUA 120.

Therefore, in order for a message 130 to successfully reach a DUA 120, multiple message-delivery precondition components typically must be satisfied.

Discovery of Valid Message-Delivery Preconditions

Figure 2:
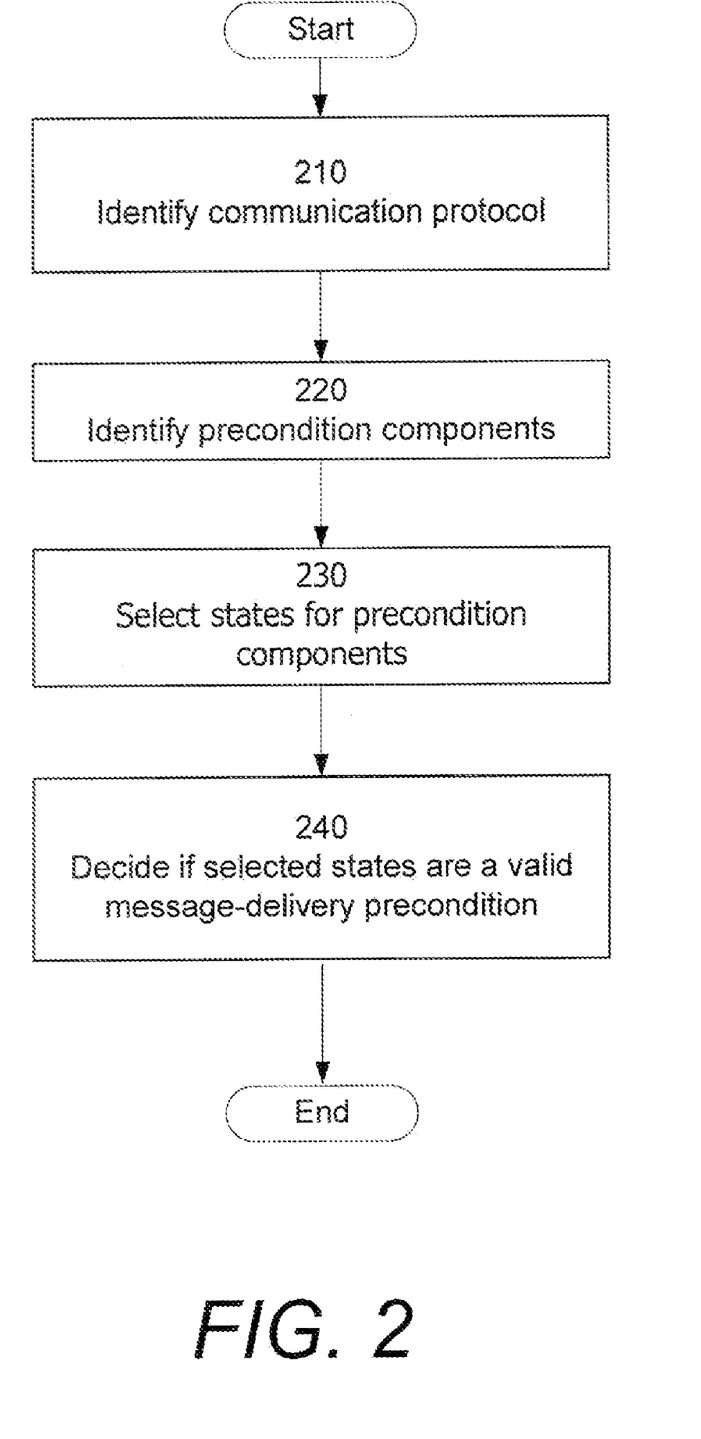
FIG. 2 illustrates a diagram of a method for discovering message-delivery precondition components for delivering an attack to a device-under-analysis, according to one embodiment of the invention.

In some cases, the universe of possible precondition components may not be known a priori, and which combinations of precondition components are supported by a DUA may also not be known a priori. FIG. 2 illustrates a diagram of a method for discovering message-delivery precondition components for delivering an attack to a device-under-analysis, according to one embodiment of the invention. The security analyzer 110 explores different combinations of protocol deployments to discover which combinations of message-delivery precondition components are supported by the DUA 120. Other embodiments perform the steps in different orders and/or perform different or additional steps than the ones shown in FIG. 2. The security analyzer 110 can perform multiple instances of the steps of FIG. 2 concurrently and/or perform steps in parallel.

The security analyzer 110 identifies 210 a communication protocol for the DUA 120. In one embodiment, the identified protocol is preferably a top-layer protocol (e.g., HTTP, SMTP). The protocol can be identified 210 by a human operator of the security analyzer 110 based on his personal knowledge of the DUA 120. Alternatively, it can be identified 210 by the security analyzer 110 based on its previous exchange of messages with the DUA 120 or other relevant information. For example, for an email server known to support SMTP, the operator of the security analyzer 110 can instruct the security analyzer 110 to identify 210 SMTP for the email server. In one embodiment, for DUAs 120 that are treated as black boxes, the security analyzer 110 can randomly identify 210 a protocol for the DUA 120, or identify 210 a protocol based on some predefined criteria (e.g., identify 210 the protocol associated with the most recent successful discovery).

The security analyzer 110 identifies 220 different precondition components associated with the identified protocol and also various states for the components. As described above, in order for a message 130 to successfully reach the DUA 120, a message-delivery precondition normally must be satisfied (i.e., a combination of precondition components supported by the DUA must be selected). For example, the message 130 typically must comply with the protocols used, and these protocols must be set to proper protocol states. Each of the identified precondition components typically can be in one of multiple states. One or more of the multiple states can be related to one or more precondition components. In one embodiment, the state of a precondition component can be fixed. That is, the precondition component may have only one possible state.

In one embodiment, the identified precondition components and their associated possible states can be expressed as a graph. In the graph, each possible state is represented by a node. The states for each precondition component are grouped into a stage. Therefore, each stage includes one or more states for a precondition component.

There often is a sequence among the stages in the graph. That is, when sending a message 130 to the DUA 120, the components in the precondition often are fulfilled sequentially. For example, assume a message 130 must comply with both TCP and IPv4 in order to successfully reach the DUA 120. The message 130 is first processed by IP in the DUA 120 before passed on to the TCP. Therefore, the stage corresponding to the network layer protocol (IP) precedes the stage corresponding to the transport layer protocol (TCP). As another example, assume the DUA 120 requires channel establishment and authentication to accept a message 130. In order for the DUA 120 to authenticate a client, the client first establishes the channel in between. Thus, the stage corresponding to channel establishment precedes the stage corresponding to authentication.

Therefore, a precondition can be represented as a path of states through the stages in the graph. As discussed above, in order for a message to reach the DUA 120, all components in the precondition must be satisfied. Because the components are represented as sequential stages in the graph, a precondition can be expressed as a path of states through the stages in the graph. If each state in the path satisfies the requirement for the corresponding precondition component, then the overall precondition is satisfied. In one embodiment, if a precondition component is optional, it can be satisfactory for that precondition component to be in a state NONE.

Continue now with the example where the security analyzer 110 identifies 210 SMTP for the DUA 120. The security analyzer 110 identifies 220 the following precondition components associated with SMTP: tunneling protocol, network layer protocol, transport layer protocol, establishment message, and authentication scheme. The states of the identified precondition components are illustrated in the graph illustrated in FIG. 3. The states associated with the precondition component of tunneling protocol (NONE, L2TP, and PPPOE) are grouped together into a stage labeled "Tunneling Protocol." The states associated with the precondition component of network layer protocol (IPv4 and IPv6) are grouped together into a stage labeled "Network Layer Protocol." The state associated with the precondition component of transport layer protocol (TCP) is placed into a stage labeled "Transport Layer Protocol." The states associated with the precondition component of establishment message (HELO and EHLO) are grouped together into a stage labeled "Establishment Message." The states associated with the precondition component of authentication scheme (NONE, PLAIN, LOGIN, and CRAM-MD5) are grouped together into a stage labeled "Authentication Scheme." The stage of Tunneling Protocol precedes the stage of Network Layer Protocol, which precedes the stage of Transport Layer Protocol, which precedes the stage of Establishment Message, which precedes the stage of Authentication Scheme.

In some embodiments, the states of the precondition components are evaluated based on previous discoveries. The evaluation is to eliminate those states that are already discovered not supported by the DUA 120 from the graph. For example, suppose that while discovering precondition components associated with HTTP, the security analyzer 110 determined that the DUA 120 does not support tunneling protocol PPPoE. Subsequently, when discovering precondition components associated with SMTP, the security analyzer 110 can evaluate the states and eliminate the state corresponding to PPPoE from the graph, since it already determined that the DUA 120 does not support PPPoE.

In some embodiments, the security analyzer 110 identifies 220 precondition components that represent all of the possible requirements in a precondition. In some other embodiments, the security analyzer 110 identifies 220 precondition components that only represent certain of the requirements in the precondition. For example, the security analyzer 110 may only identify two precondition components for SMTP (e.g., network layer protocol and transport layer protocol), even though other requirements also need be satisfied in order to fulfill the message-delivery precondition (e.g., tunneling protocol, establishment message, authentication scheme, etc.).

Figure 4:
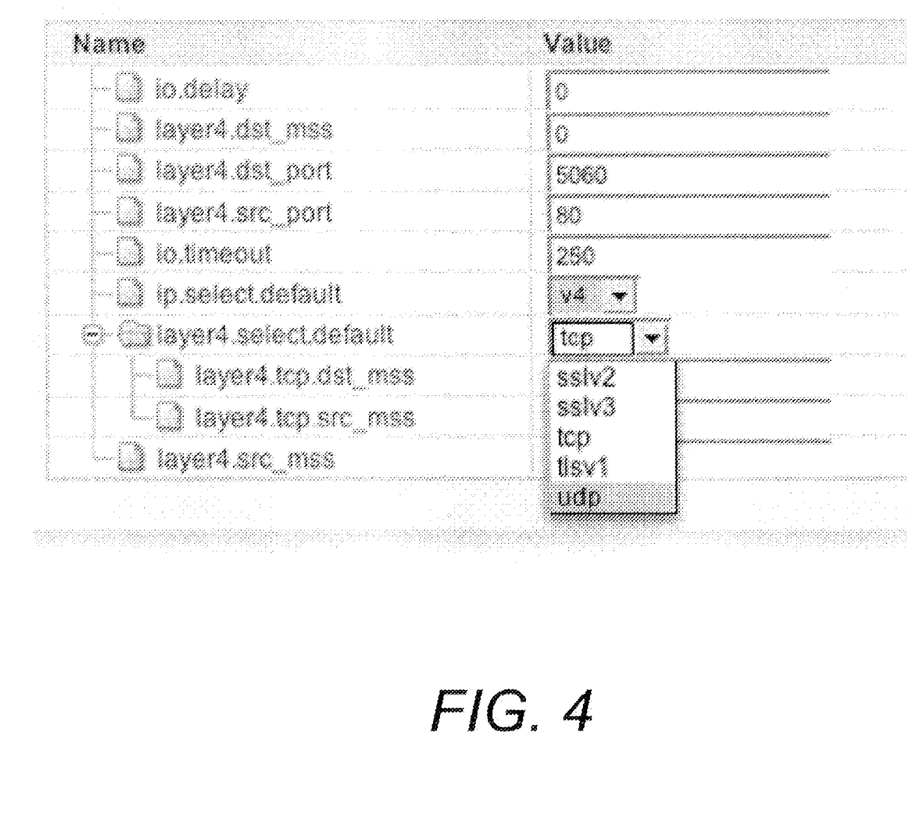
FIG. 4 illustrates a screen shot depicting an example of graphical user interface, according to one embodiment of the invention.

The security analyzer 110 sets 230 states for the precondition components. Similar to the identification 210 of the protocol, the setting 230 can be conducted by the human operator of the security analyzer 110 or by the security analyzer 110. For example, FIG. 4 illustrates a graphical user interface for the operator to set the states for some of the precondition components. In FIG. 4, among other things, a user can determine 230 the transport layer protocol (label as layer4.select.default in the figure) used to communicate with the DUA 120. The operator can choose from a pull-down menu one of the following states: Secure Socket Layer version 2 (SSLv2), Secure Socket Layer version 2 (SSLv3), TCP, Transport Layer Security version 1 (TLSv1), and User Datagram Protocol (UDP).

In some embodiments, the security analyzer 110 determines 230 a state for each of the precondition components. In some other embodiments, the security analyzer 110 determines 230 a state for only some of the identified precondition components. In one embodiment, the security analyzer 110 determines 230 states for the precondition components with higher precedence. For example, the security analyzer 110 can determine 230 states for tunnel protocols and network layer protocols as illustrated in FIG. 2, since these precondition components precede the other precondition components.

In some embodiments, the security analyzer 110 determines 230 states for the precondition components based on previous determinations. For example, if a collection of states have already been explored, the security analyzer 110 can be configured not to repeat the determination 230 for the same collection of states. Also, if a collection of states (the subset) have been determined not to be supported (e.g., no tunnel protocol), the security analyzer 110 can be configured not to determine 230 a collection of states (the superset) that include the subset. This is because if the requirements corresponding to the subset are proven not to be supported by the DUA 120, the requirements corresponding to the superset also cannot be supported by the DUA 120.

In some embodiments, the determination of the state of one precondition component is independent from the determination of the state of another precondition component. In other embodiments, the determinations of two (or more) precondition components have effects on each other. For example, the determination of the state of network layer protocol (e.g., IPv4 or IPv6) can affect the determination of the port setting for the application layer protocol (e.g., FTP).

Figure 3:
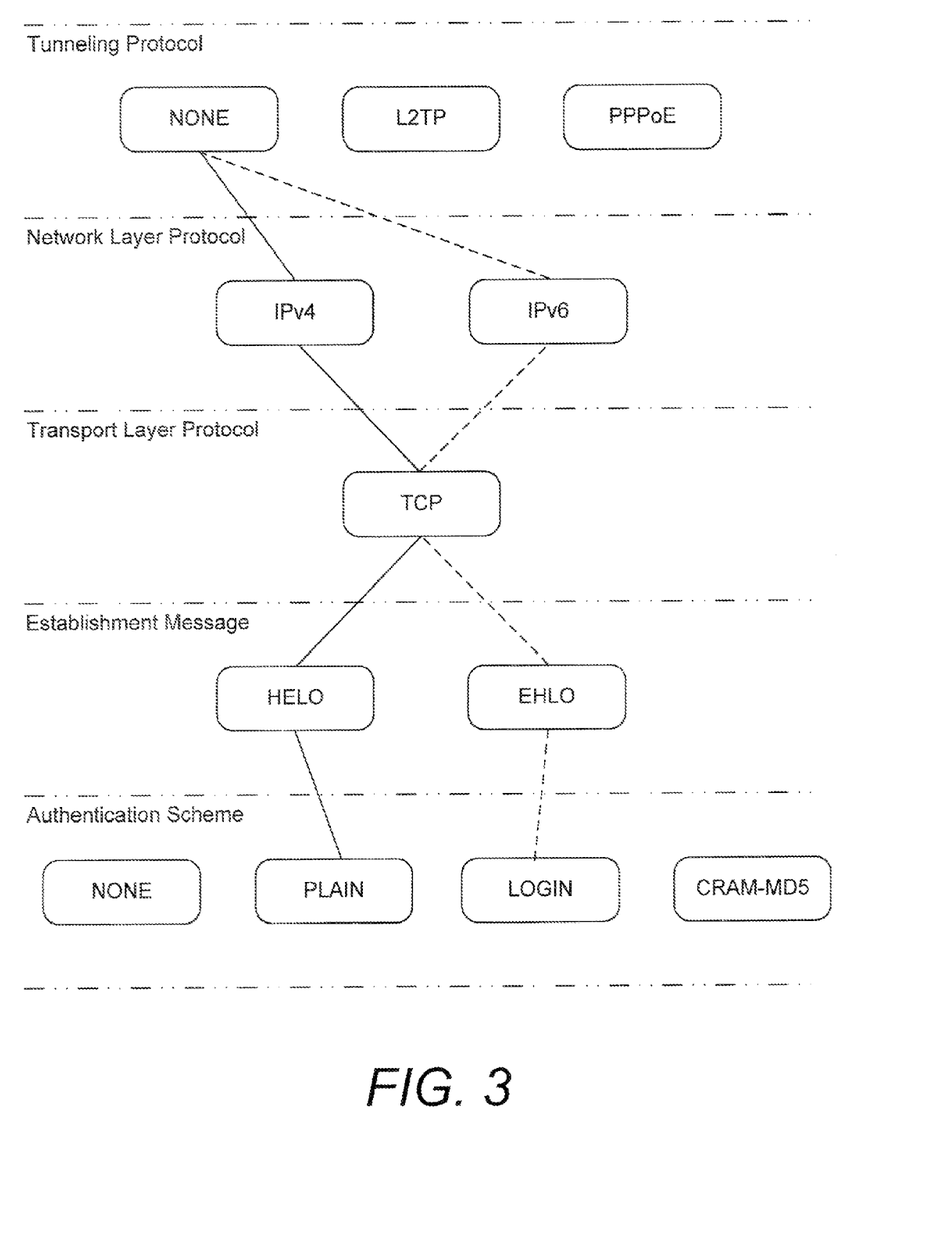
FIG. 3 illustrates a graph of states for different combinations of message-delivery precondition components, according to one embodiment of the invention.

Continuing with the example illustrated in FIG. 3, the security analyzer 110 selects 230 the states of the precondition components. The security analyzer 110 sets 230 the state of tunneling protocol to NONE, meaning that communications with the DUA 120 do not use any tunneling protocol. The security analyzer 110 sets 230 the state of the network layer protocol to IPv4 and the state of the transport layer protocol to TCP, meaning that communications with the DUA 120 comply with TCP/IPv4. The security analyzer 110 sets 230 that the state of the establishment message to HELO and the state of the authentication scheme to NONE, meaning that the security analyzer 110 submits a HELO command and attempts to establish authentication using PLAIN authentication scheme with the DUA 120. These selections are shown by the solid line in FIG. 3.

The security analyzer 110 determines 340 whether the selected states for the precondition components are supported by the DUA 120. In some embodiments, the security analyzer 110 can make the determination by transmitting test messages to the DUA 120 based on the selected states and analyzing the response (or lack of response) from the DUA 120. The communication can include submitting test message sequences or exchanging messages with the DUA 120.

A DUA 120 typically will respond to a test message 130 in one of the following manners: (1) returning an error message 140 stating that the test message 130 it received is not supported (e.g., message/command not recognized); (2) returning an error message 140 stating that the test message 130 it received contains an error (e.g., mismatch login name/password); (3) returning a successful message 140 (e.g., authorization confirmed); and (4) no response. For the first and forth scenarios, the security analyzer 110 can conclude 240 that the determined states are not supported by the DUA 120.

For the second scenario, the security analyzer 110 can determine 240 that the states are supported by the DUA 120, and that the message 130 contains one or more errors (e.g., wrong login name/password). The security analyzer 110 can then request such information from the operator, or retrieve the information from other sources, generate new test messages based on the new information, and transmit the new test messages to the DUA 120.

For the third scenario, the security analyzer 110 can determine 240 that this combination of states are supported. When reporting errors (scenarios 1 and 2), the DUA 120 typically not only identifies the errors but also suggests the correct/supported messages. Therefore, the security analyzer 110 can determine whether the states are supported, and identify the supported states based on the response from the DUA 120.

Continue with the example illustrated in FIG. 3. Assume the security analyzer 110 sets 230 the states for the tunneling protocol to NONE, the network layer protocol to IPv4, the transport layer protocol to TCP, the establishment message to HELO and the authentication scheme to PLAIN. The security analyzer 110 then generates a HELO message complying with IPv4 and TCP, and sends the HELO message 130 to the DUA 120. If the DUA 120 returns a successful response message 140 (e.g. "250 Hello mydomain.com"), the security analyzer 110 can conclude 240 that this combination of precondition components (i.e., this specific precondition) is supported by the DUA 120. However, if the DUA 120 does not return such a response message 140 or returns an error message 140 stating that the HELO command is not recognized, the security analyzer 110 can conclude 240 that this combination is not supported. It might also determine 240 more specific information, such as that the HELO command is not supported by the DUA 120.

Alternately, the security analyzer 110 may have previously determined that the tunneling protocol of NONE, the network layer protocol of IPv4, and the transport layer protocol of TCP are supported by the DUA 120. The messages described above may be used to probe which Establishment Messages are supported by the DUA 120.

By traversing the graph of precondition components, the security analyzer 110 can identify which combinations of components are supported. As described above, a precondition can be expressed by a path of states through the stages in the graph. If the security analyzer 110 determines 240 that a selected combination of states is supported by the DUA 120, the security analyzer 110 can identify that combination of states as a valid precondition for the DUA.

In one embodiment, the security analyzer 110 repeatedly selects 230 states for the precondition components and determines 240 whether the resulting combination is supported by the DUA 120. By doing so, the security analyzer 110 walks through different paths of the graph and figures out which paths are supported by the DUA 120. Because a precondition can be represented by a path of states in the graph, the security analyzer 110 can discover all valid preconditions associated with the identified protocol in this manner.

For example, suppose that the security analyzer 110 repeats the above process for all combinations of states in the graph in FIG. 3 and identifies two paths of states supported by the DUA 120. One valid precondition, as illustrated in solid lines, comprises the state of NONE for Tunneling Protocol, state of IPv4 for Network Layer Protocol, state of TCP for the Transport Layer Protocol, state of HELO for the Establishment Message, and the state of PLAIN for the Authentication Scheme. The security analyzer 110 also identifies a second valid precondition based on the path illustrated in the dashed lines. In the second precondition, the test message 130 complies with no tunneling protocol and TCP/IPv6, an EHLO command is transmitted to the DUA 120, and the security analyzer 110 establishes authentication under the LOGIN scheme.

In some embodiments, the security analyzer 110 can select 230 states based on previous determinations. For example, the security analyzer 110 might receive an error message 140 from the DUA 120 indicating that some aspect of the previously selected state is not supported and suggesting an alternative state. The security analyzer 110 can subsequently select 230 the suggested alternative state for the associated precondition component.

In some embodiments, the security analyzer 110 is configured to repeat the above-described process to discover other valid preconditions of the DUA 120. The security analyzer 110 can identify 310 another protocol and discover the associated precondition components. For example, after the security analyzer 110 discovers precondition components associated with SMTP, it can repeat the process to discover precondition components and valid preconditions associated with other protocols (e.g., HTTP, FTP). The security analyzer 110 can eliminate states/precondition components based on previous discovery with regard to the DUA 120. For example, if the security analyzer 110 previously determined that the DUA 120 does not support tunneling protocols, the security analyzer 110 can determine that tunneling protocol need not be explored in the subsequent discoveries to the DUA 120.

In one embodiment, if the security analyzer 110 determines that the DUA 120 supports a protocol, the security analyzer 110 will attempt to conduct with respect to protocols related to the supported protocol. For example, each new protocol that is developed leverages the work of previous protocols. For example, a Request for Comments (RFC) regarding a protocol often directly references several other RFCs. Those RFCs, in turn, reference other RFCs, etc. Therefore, if a DUA 120 supports or implements a protocol, the DUA 120 should also be discovered with respect to previous protocols that were leveraged by the supported or implemented protocol.

In the embodiment described above the security analyzer 110 sent test messages 130 to the DUA 120 and analyzed response messages from the DUA. This is only one test configuration, which is appropriate for testing client-server where the DUA is the client. However, other configurations are also possible. In one embodiment, the DUA 120 acts as a pass-through device. For example, the security analyzer 110 may act as both the sender and recipient of a communications link with the DUA 120 acting as a node along the link. In that case, instead of analyzing precondition components based on responses from the DUA 120, the security analyzer 110 acting as sender can send test messages 130 to the DUA 120, which then transfer the test messages 130 (or modified versions of the test messages) back to the security analyzer 110 acting as recipient. The security analyzer 110 can analyze the message-delivery preconditions based on this message flow.

In another embodiment, instead of proactively sending test messages 130 to the DUA 120, the security analyzer 110 can receive messages from the DUA 120 and return test messages to the DUA 120, which would be appropriate for testing client-server where the DUA is the server. In this case, since the DUA is initiating communications, the security analyzer 110 may control the DUA via an out-of-band channel.

Protocol Vulnerability Analysis

A DUA 120 can be vulnerable to many different attacks. Each attack helps to analyze a different aspect of the security of the DUA 120. Thus, in order to analyze the security of a DUA 120, it is desirable to attack the DUA 120 in several different ways. These attacks preferably should be designed to exhaustively test the behavior of the DUA 120 in response to various inputs.

In one embodiment, the security analyzer 110 attacks the DUA 120 by transmitting attack messages to the DUA 120. In one embodiment, an attack message 130 comprises a permutation of improper or illegal protocol behaviors. For example, an attack comprises a combination of packets and/or sessions (stateful or stateless) that violates a protocol's specified standards or tries to break a protocol's standard operation via various values or parameters.

The security analyzer 110 can use the discovered preconditions to attack the DUA 120. Because the deployments of the DUA 120 allows messages 130 to successfully reach the DUA 120 as long as one of the valid message-delivery preconditions is met, the security analyzer 110 can successfully transmit attack messages 130 to the DUA 120 using the discovered preconditions. To exhaustively test the behavior of the DUA 120, the security analyzer 110 can deliver attack messages to the DUA 120 using each of the valid preconditions.

The security analyzer 110 can also attack the precondition components themselves. The precondition components are often protocols themselves and, therefore, may be vulnerabilities for the DUA. In some embodiments, the security analyzer 110 attacks every state along a valid precondition. Because each of the states in the precondition reflects the deployment of the DUA 120, the security analyzer 110 can attack the DUA 120 based on each of these requirements. For example, the security analyzer 110 can attack the HELO state by transmitting fraudulent HELO messages (e.g., wrong IP address). As another example, the security analyzer 110 can attack the TCP supported by the DUA 120.

In one embodiment, the security analyzer 110 attacks every state that is determined to be supported by the DUA 120, even if no valid precondition includes such state. In one embodiment, the security analyzer 110 stores a list of the states that are determined to be supported by the DUA 120. It is noted that some of the attacks may not reach the DUA 120. For example, attacks targeting at a tunneling protocol may only reach a network device (e.g., a firewall) and not the DUA 120 itself.

As described above, a computer networking protocol is often designed using several protocol layers. In a layered protocol, a higher-layer protocol runs on top of a lower-layer protocol. Thus, the implementation of a higher-layer protocol depends on the implementation of a lower-layer protocol. This means that a higher-layer protocol inherits the vulnerabilities of all of the layers below (in addition to adding its own vulnerabilities). Therefore, if a DUA 120 supports or implements part of a layered protocol, the security analyzer 110 can also test with respect to all layers below the supported or implemented layer. A protocol can be vulnerable to many different attacks.

In one embodiment, the security analyzer generates an attack automatically based on a protocol (e.g., based on a description of the protocol or the protocol's grammar). In one embodiment, the security analyzer generates attacks that combine to exhaustively cover the scope of a protocol.

For example, the security analyzer 110 can attack a DUA 120 using a HELO command in several different manners. One set of attack messages 130 can target the HELO command as a whole. For example, an extra field can be added to the message (e.g., by appending a random number or string). Another set of attack messages 130 can target a field of the message. For example, the host (IP address) field can be attacked by setting its value to 0.0.0.0. Each attack message 130 can be thought of as a mutation (e.g., a function or algorithm) that is applied to a valid protocol message in order to generate an invalid protocol message.

Detailed description and embodiments of generating attacks can be found in U.S. patent application Ser. No. 11/514,809, entitled "Automated Generation of Attacks for Analyzing the Security of Communication Protocols and Channels," filed on Sep. 1, 2006, the disclosure of which is hereby incorporated by reference in its entirety.

Additional Embodiments

A security analyzer can be implemented in hardware, software, or a combination of both. Regarding software, a security analyzer can be, for example, a single application (executing within a single operating system or single physical device) or a pair of applications (one to send test messages and one to receive response messages; executing within the same device and communicating with each other to correlate sent and received messages). Regarding hardware, a security analyzer can be, for example, a pair of physical devices (one to send test messages and one to receive response messages) with out-of-band synchronization to correlate sent and received messages. In one embodiment, the security analyzer is a portable appliance that can be transported to different locations to analyze the security of different devices.

In one embodiment, a security analyzer includes various software tools to help a user analyze a device. These tools can enable the user to perform, for example, reporting, trending, auditing, and comparative metrics on analysis results. The tools can also summarize analysis results or detail specific faults.

Other aspects of security analyzers can include identification of a failure or other alteration in behavior; fault isolation (determining which attack caused which response) and logging; and a restarting feature. Security analyzers are further described in U.S. application Ser. No. 11/351,403, filed on Feb. 10, 2006, entitled "Platform for Analyzing the Security of Communication Protocols and Channels," and U.S. application Ser. No. 11/514,809, filed on Sep. 1, 2006, entitled "Automated Generation of Attacks for Analyzing the Security of Communication Protocols and Channels," both of which are hereby incorporated by reference in their entirety.

In the preceding description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

APPENDIX A

Communication protocols (or Networking protocols) include, for example, Address Resolution Protocol (ARP), Border Gateway Protocol (BGP), Cisco Discovery Protocol (CDP), Common Unix Printing System (CUPS), Distributed Computing Environment/Remote Procedure Calls (DCE/RPC), Dynamic Host Configuration Protocol (DHCP), File Transfer Protocol (FTP), HyperText Transfer Protocol (HTTP), Internet Control Message Protocol (ICMP), Internet Group Management Protocol (IGMP), Internet Message Access Protocol (IMAP), Internet Protocol version 4 (IPv4), Internet Protocol version 6 (IPv6), Internet Security Association and Key Management Protocol (ISAKMP), Light Weight Directory Access Protocol (LDAP), Media Gateway Control Protocol (MGCP), Multipurpose Internet Mail Extension (MIME), Network Basic Input/Output System (NetBIOS), Open Shortest Path First (OSPF), Post Office Protocol 3 (POP3), Protocol-Independent Multicast (PIM; including Sparse Mode (SM) and Dense Mode (DM)), Real Time Streaming Protocol (RTSP), Remote Administration Protocol (RAP), Remote Authentication Dial-In User Service (RADIUS; including extensions from Cisco Systems, Juniper Networks, and Microsoft), Routing Information Protocol (RIP), Secure Shell (SSH), Secure Sockets Layer (SSL), Server Message Block (SMB), Session Announcement Protocol (SAP), Session Initiation Protocol (SIP), Simple Mail Transfer Protocol (SMTP), SMTP Email, SMTP Multipurpose Internet Mail Extension (MIME), SMTP MIME Joint Photographic Experts Group (JPEG), SMTP MIME X.509, Simple Network Management Protocol (SNMP; including SNMP trap), Simple Service Discovery Protocol (SSDP), Sun Microsystems Remote Procedure Call (SunRPC; including portmapper and statd), Terminal Access Controller Access Control System Plus (TACACS+), Transmission Control Protocol (TCP), Transport Layer Security (TLS), Trivial File Transfer Protocol (TFTP), Universal Plug and Play (UPnP), User Datagram Protocol (UDP), and Voice over Internet Protocol (VoIP). Networking protocols also include, for example, any protocol defined by an Internet Engineering Task Force (IETF) Request for Comments (RFC).

APPENDIX B

Structure attacks are generally based on messages that contain values or parameters that violate an intended protocol. Types of structure attacks include, for example: empty-field, empty-message, extra-data, incomplete, invalid-count, invalid-enum (enumeration), invalid-eol (end-of-line), invalid-field, invalid-index, invalid-length, invalid-offset, invalid-syntax, invalid-type, invalid-utf8 (Unicode Transformation Format), missing-data, missing-field, mixed-case, overflow, repeated-field, too-many-fields, truncated, underflow, and wrong-encoding.

One example of a semantics attack is a message that indicates an invalid (e.g., non-existent) printer instead of a valid printer. This can cause a software application to hang or crash unexpectedly. Another example of a semantics attack is a network packet with a source IP address of "all-broadcast." Responding to this packet would therefore generate enough packets to flood the network. Types of structure attacks include, for example: fmt-string (format), fragmented-field, invalid-encoding, invalid-field, invalid-ip (IP address), invalid-path, invalid-string, recursion, self-reference, and null-char (character).

One example of a state attack is sending messages out-of-order (e.g., with respect to the type of message the DUA is expecting to receive).

What is claimed is:

1. A method for analyzing vulnerability of a network device under analysis (DUA) to protocol abuse of a higher-layer network protocol from a layered network protocol, the layered network protocol including lower-layer network protocols that work with the higher-layer network protocol, the method comprising:
  discovering using black box testing a plurality of valid lower-layer message-delivery preconditions for the DUA to receive a message in the higher-layer network protocol, where the plurality of valid lower layer message-delivery preconditions are not known a priori, the discovering comprising repeatedly:
    selecting a lower-layer network protocol from the layered network protocol,
    selecting a configuration of the lower-layer network protocol from a plurality of configurations associated with the lower-layer network protocol, and
    sending a first message toward the DUA using the selected lower-layer network protocol and the selected configuration;
    based on a response or non-response to the first message, determining whether the selected configuration of the selected lower-layer network protocol comprises a valid lower-layer message-delivery precondition by determining whether the selected lower-layer network protocol as implemented in the DUA (1) supports the selected configuration, and (2) is used by the DUA to receive messages in the higher-layer network protocol; and
  for at least two of the discovered plurality of valid lower-layer message-delivery preconditions, attacking the DUA multiple times, the attacking comprising:
    establishing a lower-layer connection with the DUA using the lower-layer network protocol according to the one of the discovered valid lower-layer message-delivery preconditions,
    on top of the lower-layer connection, establishing a higher-layer connection with the DUA using the higher-layer network protocol, and
    through the higher-layer connection, sending to the DUA test messages that are invalid mutations of valid messages with respect to the higher-layer network protocol.

2. The method of claim 1 wherein the selecting a configuration of the lower-layer network protocol comprises:
  selecting a proper protocol state for the lower layer network protocol.

3. The method of claim 1, wherein the selecting a configuration of the lower-layer network protocol comprises:
  selecting a feature of the lower-layer network protocol, wherein determining whether the configuration of the lower-layer network protocol comprises a valid lower-layer message-delivery precondition comprises determining whether the feature is enabled in the lower-layer network protocol as implemented in the DUA.

4. The method of claim 1, wherein the lower-layer network protocol comprises at least one selected from a group consisting of: transport layer protocols, network layer protocols, data link layer protocols, and tunneling protocols.

5. The method of claim 2, wherein the proper protocol state comprises at least one selected from a group consisting of: a proper authentication scheme and a proper initial protocol negotiation option.

6. The method of claim 3, wherein the lower-layer network protocol comprises an Internet Protocol (IP), and the feature comprises Internet Protocol version 4 (IPv4) or Internet Protocol version 6 (IPv6).

7. The method of claim 1, wherein the determining whether the configuration of the lower-layer network protocol comprises a valid lower-layer message-delivery precondition comprises:
  sending a test message to the DUA using the lower-layer network protocol according to the configuration; and
  analyzing a response from the DUA to determine whether the configuration of the lower-layer network protocol comprises a valid lower-layer message-delivery precondition.

8. The method of claim 1,
  wherein the selecting the lower-layer network protocol comprises selecting two or more lower-layer network protocols from the layered network protocol,
  wherein the selecting the configuration of the lower-layer network protocol comprises selecting a configuration for each of the two or more lower-layer network protocols, and
  wherein the determining whether the configuration of the lower-layer network protocol comprises a valid lower-layer message-delivery precondition further comprises determining, for each of the two or more lower-layer network protocols, whether the lower-layer network protocol as implemented in the DUA (1) supports the configuration, and (2) is used by the DUA to receive a message in the higher-layer network protocol.

9. The method of claim 1, further comprising:
  detecting network protocols implemented by the DUA; and
  adding the detected network protocols into the layered network protocol.

10. The method of claim 1, wherein the higher-layer network protocol comprises an application layer protocol.

11. The method of claim 1, wherein the higher-layer network protocol comprises at least one selected from a group consisting of: Simple Mail Transfer Protocol (SMTP), File Transfer Protocol (FTP), and Hyper Text Transfer Protocol (HTTP).

12. The method of claim 1, wherein attacking the DUA further comprises:
  sending to the DUA test messages that are invalid with respect to the lower-layer network protocol.

13. A security analyzer apparatus for analyzing a security of a device under analysis (DUA), comprising:
  a non-transitory computer-readable storage medium encoded with executable computer program code for analyzing vulnerability of a network device under analysis (DUA) to protocol abuse of a higher-layer network protocol from a layered network protocol, the layered network protocol including lower-layer network protocols that work with the higher-layer network protocol, the computer program code comprising program code configured to:
  discover using black box testing a plurality of valid lower-layer message-delivery preconditions for the DUA to receive a message in the higher-layer network protocol, where the plurality of valid lower layer message-delivery preconditions are not known a priori, the discovering comprising repeatedly:
    selecting a lower-layer network protocol from the layered network protocol,
    selecting a configuration of the lower-layer network protocol from a plurality of configurations associated with the lower-layer network protocol, and
    sending a first message toward the DUA using the selected lower-layer network protocol and the selected configuration;

based on a response or non-response to the first message, determining whether the selected configuration of the selected lower-layer network protocol comprises a valid lower-layer message-delivery precondition by determining whether the selected lower-layer network protocol as implemented in the DUA (1) supports the selected configuration, and (2) is used by the DUA to receive messages in the higher-layer network protocol; and, for at least two of the discovered plurality of valid lower-layer message-delivery preconditions, attack the DUA multiple times, the attack comprising:
  establishing a lower-layer connection with the DUA using the lower-layer network protocol according to the one of the discovered valid lower-layer message-delivery preconditions,
  on top of the lower-layer connection, establishing a higher-layer connection with the DUA using the higher-layer network protocol, and
  through the higher-layer connection, sending to the DUA test messages that are invalid mutations of valid messages with respect to the higher-layer network protocol.

14. A non-transitory computer-readable storage medium encoded with executable computer program code for analyzing vulnerability of a network device under analysis (DUA) to protocol abuse of a higher-layer network protocol from a layered network protocol, the layered network protocol including lower-layer network protocols that work with the higher-layer network protocol, the computer program code comprising program code configured to:
  discover using black box testing a plurality of valid lower-layer message-delivery preconditions for the DUA to receive a message in the higher-layer network protocol, where the plurality of valid lower layer message-delivery preconditions are not known a priori, the discovering comprising repeatedly:
    selecting a lower-layer network protocol from the layered network protocol,
    selecting a configuration of the lower-layer network protocol from a plurality of configurations associated with the lower-layer network protocol, and
    sending a first message toward the DUA using the selected lower-layer network protocol and the selected configuration;
    based on a response or non-response to the first message, determining whether the selected configuration of the selected lower-layer network protocol comprises a valid lower-layer message-delivery precondition by determining whether the selected lower-layer network protocol as implemented in the DUA (1) supports the selected configuration, and (2) is used by the DUA to receive messages in the higher-layer network protocol; and, for at least two of the discovered plurality of valid lower-layer message-delivery preconditions, attack the DUA multiple times, the attack comprising:
    establishing a lower-layer connection with the DUA using the lower-layer network protocol according to the one of the discovered valid lower-layer message-delivery preconditions,
    on top of the lower-layer connection, establishing a higher-layer connection with the DUA using the higher-layer network protocol, and
    through the higher-layer connection, sending to the DUA test messages that are invalid mutations of valid messages with respect to the higher-layer network protocol.

15. The method of claim 2, wherein establishing a lower-layer connection with the DUA using the lower-layer network protocol according to the one of the discovered valid lower-layer message-delivery preconditions comprises:
  selecting the proper protocol state for the lower layer network protocol that allows delivery of the higher layer test messages and that was identified;
  transmitting messages using the lower level protocol that change the state of the lower level protocol to the proper state.

16. The medium of claim 14, wherein the selecting a configuration of the lower-layer network protocol comprises:
  selecting a proper protocol state for the lower layer network protocol.

17. The medium of claim 16, wherein establishing a lower-layer connection with the DUA using the lower-layer network protocol according to the one of the discovered valid lower-layer message-delivery preconditions comprises:
  selecting the proper protocol state for the lower layer network protocol that allows delivery of the higher layer test messages;
  transmitting messages using the lower level protocol that change the state of the lower level protocol to the proper state.

18. The security analyzer of claim 13, wherein the selecting a configuration of the lower-layer network protocol comprises:
  selecting a proper protocol state for the lower layer network protocol.

19. The security analyzer of claim 18, wherein establishing a lower-layer connection with the DUA using the lower-layer network protocol according to the one of the discovered valid lower-layer message-delivery preconditions comprises:
  selecting the proper protocol state for the lower layer network protocol that allows delivery of the higher layer test messages;
  transmitting messages using the lower level protocol that change the state of the lower level protocol to the proper state.

* * * * *